350-392 SR
XR 3,701,122
X 4026 T

United St

Geusic et al.

[15] 3,701,122

[45] Oct. 24, 1972

[54] FERROELECTRIC DOMAIN SHIFTING DEVICES

[72] Inventors: Joseph Edward Geusic, Berkeley Heights; Terence John Nelson, New Providence; David Paul Schinke, Berkeley Heights, all of N.J.

[73] Assignee: Bell Telephone Laboratories, Incorporated, Murray Hill, N.J.

[22] Filed: Aug. 25, 1971

[21] Appl. No.: 174,727

[52] U.S. Cl. ..........................340/173.2, 340/173 LS
[51] Int. Cl. ............................................G11c 11/22
[58] Field of Search .....................340/173.2, 173 LS

[56] References Cited

UNITED STATES PATENTS

| | | | |
|---|---|---|---|
| 3,229,261 | 1/1966 | Fatuzzo | 340/173.2 |
| 3,362,019 | 1/1968 | Gratian | 340/173.2 |

Primary Examiner—Terell W. Fears
Attorney—R. J. Guenther et al.

[57] ABSTRACT

Ferroelectric crystals which are also ferroelastic, such as gadolinium molybdate, can support stable internal ferroelectric polarization domains. These domains are expanded and moved in the ferroelectric crystal by means of a sequence of voltages applied to electrodes on the surface of the crystal. Thereby, optically readable, shift register logic functions are achieved using (for readout) an incident optical beam with respect to which the ferroelectric domains are birefringent.

10 Claims, 6 Drawing Figures

3701122
OR IN 365/110

FERROELECTRIC DOMAIN SHIFTING DEVICES

FIELD OF THE INVENTION

This invention relates to electrooptical information handling and display systems, and more particularly to ferroelectric optical devices.

BACKGROUND OF THE INVENTION

In U.S. Pat. No. 3,142,045, issued to A. H. Bobeck on July 21, 1964, there is described a shift register device using a ferroelectric crystal as the memory propagating medium, which can support two states of information in the form of domains of internal electric polarization. Information address (creation) of each domain followed by shifting propagation of the domain, as well as subsequent creation of a new domain, was accomplished by means of a six-phase voltage pulse source circuit. The six-phase characteristic of the voltage pulse circuit was necessitated by the use therein of information bit groups each comprising a plurality of electrode segments. On the other hand, it is known that those ferroelectric crystals which are also ferroelastic can support domains of internal polarization which are more stable than domains in ferroelectric crystals which are not ferroelastic.

SUMMARY OF THE INVENTION

We have found that an information bit (polarization domain) in a ferroelectric crystal, which is advantageously also ferroelastic, can be defined by a single electrode segment, thereby enabling the use of simpler domain propagation (shifting) circuits than in the prior art. Specifically, using ferroelectric crystals which can support domains of polarization, and advantageously which are also ferroelastic, a three-phase voltage pulse circuit is utilized in a ferroelectric polarization domain shifting device. As used herein, the term "domain" means a region of one internal ferroelectric polarization direction in the crystal surrounded by region(s) of different (typically opposite) internal polarization and by the physical boundary of the crystal itself (only partially, if at all). Each bit location is defined by a single electrode to which voltage pulses are applied. Information is contained in the pattern of domains of polarization in the crystal, each domain being in one of two stable states of internal electric polarization. Readout of the pattern of domains at any instant can be accomplished with a polarized optical beam, since the optical birefringence of the crystal is a function of the state of polarization. Thus, shifting optical display devices, as well as shift register logic function devices, can be provided using the principles of this invention.

In a specific embodiment of the invention, a ferroelectric crystal of gadolinium molybdate serves as the information propagating medium. A three-phase voltage pulse circuit is connected to an array of electrodes on a major surface of the crystal, in order to furnish electric fields in the crystal which create and propagate information in the crystal in the form of internal polarization domains in the crystal. Readout of the pattern of domains at any particular location (or over the whole operating portion of the crystal) is accomplished by means of a beam of light incident upon the crystal located between a quarter-wave plate and an optical polarizer and an analyzer.

In another specific embodiment of this invention, three essentially identical ferroelectric parallel-sided plates are arranged such that a beam of optical radiation passes through all of them. Domains of ferroelectric polarization in the plates are characterized by two states of polarization, corresponding in one state to a relative phase retardation between orthogonal polarizations in the beam equal to one-quarter of a wavelength of the optical radiation, and in the other state to a relative phase retardation also of one-quarter of a wavelength but in the opposite sense. By appropriate shifting of the domains in the three plates, in conjunction with a quarter-wave plate, a switching optical half-wave retardation device is formed. Such a device is useful, for example, in an optical shutter formed by locating the half-wave retardation device between a pair of crossed optical polarizers.

This invention, together with its objects, advantages, and features can be better understood from the following detailed description when read in conjunction with the drawing in which.

Figure 1:
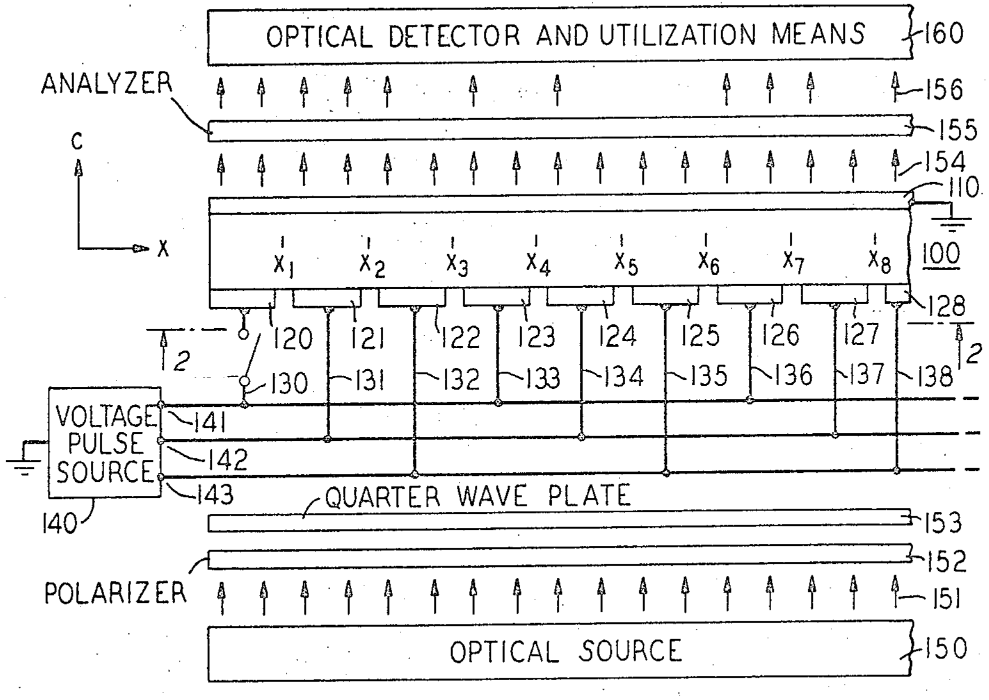
FIG. 1 is a side view diagram of ferroelectric shift register apparatus in accordance with a specific embodiment of the invention.
Figure 2:
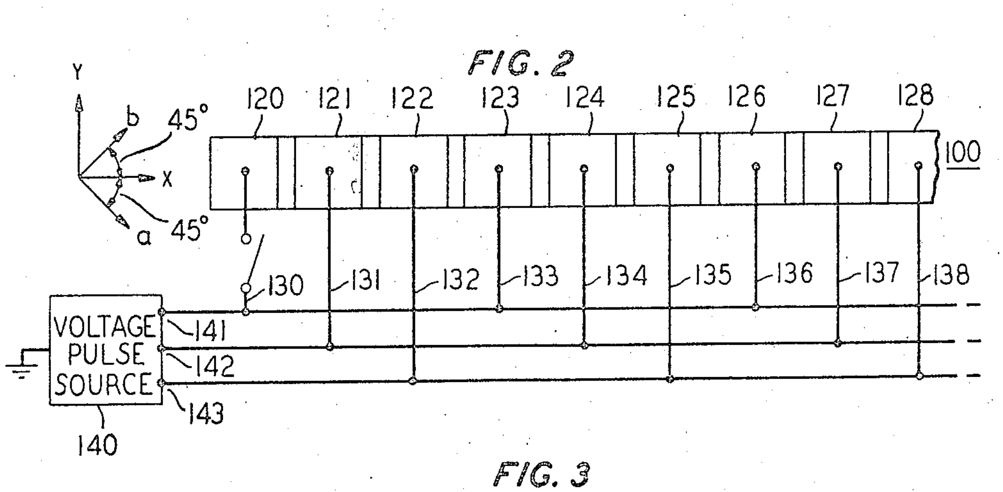
FIG. 2 is a top view diagram of the apparatus shown in FIG. 1.

FIGS. 1 and 2 show a ferroelectric crystal plate 100 with a grounded transparent electrode layer 110 on a major surface thereof, and an array of transparent electrodes 120–128 on an opposed major surface. Typically, the plate 100 is a single crystal of gadolinium molybdate oriented with its *c* axis parallel to an incoming monochromatic beam 151 of optical radiation from an optical source 150, typically a helium-neon or other visible laser source. A polarizer 152 is oriented to transmit only that transverse optical polarization component of the beam 151 which is parallel to the *x* axis indicated at the left-hand side of FIG. 2, that is, at 45° with respect to the (orthogonal) *a* and *b* axes of the crystal plate 100. In addition, a quarter-wave plate 153 retards the *a*-component of optical polarization of the incoming beam by a phase of 90° with respect to the *b*-component. The thickness of the plate 100 is selected advantageously such that the *a*- and *b*-components of the optical radiation are further and selectively (along the cross section of the beam) relatively retarded by ± 90° upon propagating through the plate 100, depending upon the state of electric polarization of the corresponding portions of the plate 100 through which the optical beam propagates. Thereby, in propagating through both the quarter-wave plate 153 and the ferroelectric crystal 100, the various portions of the cross section of the optical beam 154 (along the *x* direction) have undergone a total relative phase retardation between the *a* and *b* optical polarization components of advantageously 0° or 180° depending upon the distribution (along the $x$ direction) of the states of electric polarization ($\pm c$ orientation) in the crystal 100. These latter states depend upon the sequence of voltage pulses applied to the electrodes 120–128, as described herein below. After propagating through an optical analyzer 155, which is crossed with respect to the polarizer 152, the exit beam 156 is impressed with a pattern of bright and dark portions along the $x$ direction, because (as known in the art) a relative phase retardation of 180° of orthogonal $a$ and $b$ optical polarization components corresponds to a rotation of the direction of polarization in space by 90°. An optical detector and utilization means 160 detects and utilizes this exit beam 156.

In order to impress the shifting pattern of bright and dark portions upon the exit beam 156, a voltage pulse source 140 having three output terminals 141, 142, and 143 provides voltage pulses, in sequence described below, to the electrodes 120–128, in accordance with the time sequence indicated in FIG. 3, by means of wire leads 130–138. It should be noted that advantageously one of the electrodes, the edge electrode 120, can be disconnected from terminal 141 by a switch on wire lead 130, in order to provide means for controlling the application vel non of any voltage pulses from the terminal 141 to the electrode 120 and hence to control the initial write-in of a bit of information (polarization state) to the left-hand edge of the crystal 100.

Figure 3:
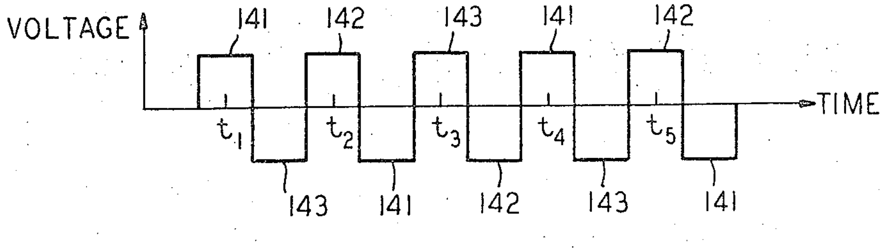
FIG. 3 is a plot of voltage versus time, useful in describing the operation of the apparatus shown in FIGS. 1 and 2.

To operate the apparatus shown in FIGS. 1 and 2 as indicated in FIG. 3, at time $t_1$, a positive voltage pulse is applied to the terminal 141 of the voltage pulse source 140. At a later time, $t_2$, a positive pulse is applied to the terminal 142, etc. Between $t_1$ and $t_2$, a negative pulse is applied to the terminal 143, etc.

Figure 4:
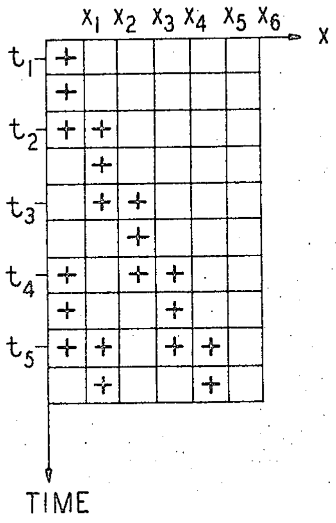
FIG. 4 is an illustrative diagram of a mode of ferroelectric domain propagation in the operation of the apparatus shown in FIGS. 1 and 2.

In order to explain the operation of the apparatus shown in FIGS. 1 and 2, reference is made to FIG. 4 in which the propagation of "±" domains (i.e., internally polarized in the positive $c$ direction) is shown in a time plot illustrating the position and extent of these "positive" domains as time progresses. Assuming that the switch connecting the wire lead 130 with the electrode 120 is closed when the pulse at $t_1$ is applied, and assuming that initially the plate 100 is everywhere internally polarized in the negative $c$ direction, then when the first positive pulse is applied at $t_1$ from terminal 141 to the electrode 120, the plate 100 will be polarized in the positive $c$ direction, as indicated in FIG. 4, from the left-hand edge to $x = x_1$ (that is, underneath electrode 120) and in the negative $c$ direction for $x > x_1$. Similarly, when the positive pulse at $t_2$ is applied to electrode 121, then the plate 100 becomes polarized in the positive $c$ direction from the left-hand edge to $x = x_2$ (FIG. 4), i.e., under electrodes 120 and 121, and remains negatively polarized elsewhere. Then, as further indicated in FIG. 4, when a negative pulse from terminal 142 is applied to electrode 121 between times $t_2$ and $t_3$, only that portion of the plate 100 underneath electrode 121 remains polarized in the positive $c$ direction. As further illustrated in FIG. 4, when a positive pulse is thereafter applied at time $t_3$ from terminal 143 to electrode 122, then the plate 100 is polarized in the positive $c$ direction under both the electrodes 121 and 122, and in the negative $c$ direction elsewhere in the plate. Thereafter, a negative pulse from terminal 142 to electrode 121 puts the plate 100 in a condition in which its internal polarization is parallel to the positive $c$ axis only under electrode 122. At $t_4$, assuming the switch on wire lead 130 is still closed, a positive pulse from terminal 141 renders the internal polarization parallel to the positive $c$ axis under electrodes 120, 122, and 123, and parallel to the negative $c$ axis elsewhere in the plate 100. On the other hand, if during this last pulse at $t_4$, the switch on wire lead 130 had been kept open, the polarization in the plate 100 under electrode 120 would have remained parallel to the negative $c$ axis, thereby affording the capability of write-in vel non of a positive internal polarization to be shifted along the $x$ direction. Thus, the sequence of pulses shown in FIG. 3, provides a three-phase applied pulse voltage for propagation of domains along the $x$ direction of the plate 100, as illustrated in FIG. 4 (assuming the switch on wire lead 130 is always closed), each domain being a local region of internal ferroelectric polarization parallel to the positive or to the negative $c$ axis of this crystal plate 100.

Advantageously, the electrodes 120–128 (FIG. 2) all extend in the $\pm y$ direction to the edges of the plate 100, so that the domains likewise extend in the $\pm y$ direction to these edges. Thus, the boundaries of each domain in the $x$–$y$ plane will be coextensive with the projection of the outer contour of a single one of the electrodes or a group of next neighboring electrodes (FIG. 4).

It should be apparent that a plurality of plates similar to the plate 100 can be juxtapositioned so as to provide a two-dimensional array of shifting domains suitable for shifting optical display systems.

In a typical example by way of illustration only, the plate 100 is gadolinium molybdate, 0.033 cm thick in the $c$ direction, and each of the electrodes 120–128 is 0.1 cm wide in the $x$ direction and 0.2 cm in the $y$ direction. (FIG. 2, left-hand side). Each of the voltage pulses supplied by the source 140 to the terminals 141–143 is ± 200 volts with a pulse duration of $10^{-2}$ sec. The wavelength of the optical radiation in the beam 151 supplied by the source 150 is 6,328 angstroms (helium-neon laser).

It should be pointed out that it is advantageous that the end electrode 120 extend sufficiently close to the edge of the plate 100 (or overlap same), in order that a pulse from terminal 141 will produce the edge domain corresponding to the polarity of the pulse, since the threshold for domain formation (as opposed to movement of its boundary) is relatively much greater in the interior of the plate 100 than at its edges. In addition, the thickness of the plate 100 can be doubled, in order to furnish a 180° (instead of 90°) change in relative phase retardation between the $a$ and $b$ polarization components, at some sacrifice of further optical radiation loss in the plate but thereby obviating the need for the quarter-wave plate 153.

Figure 5:
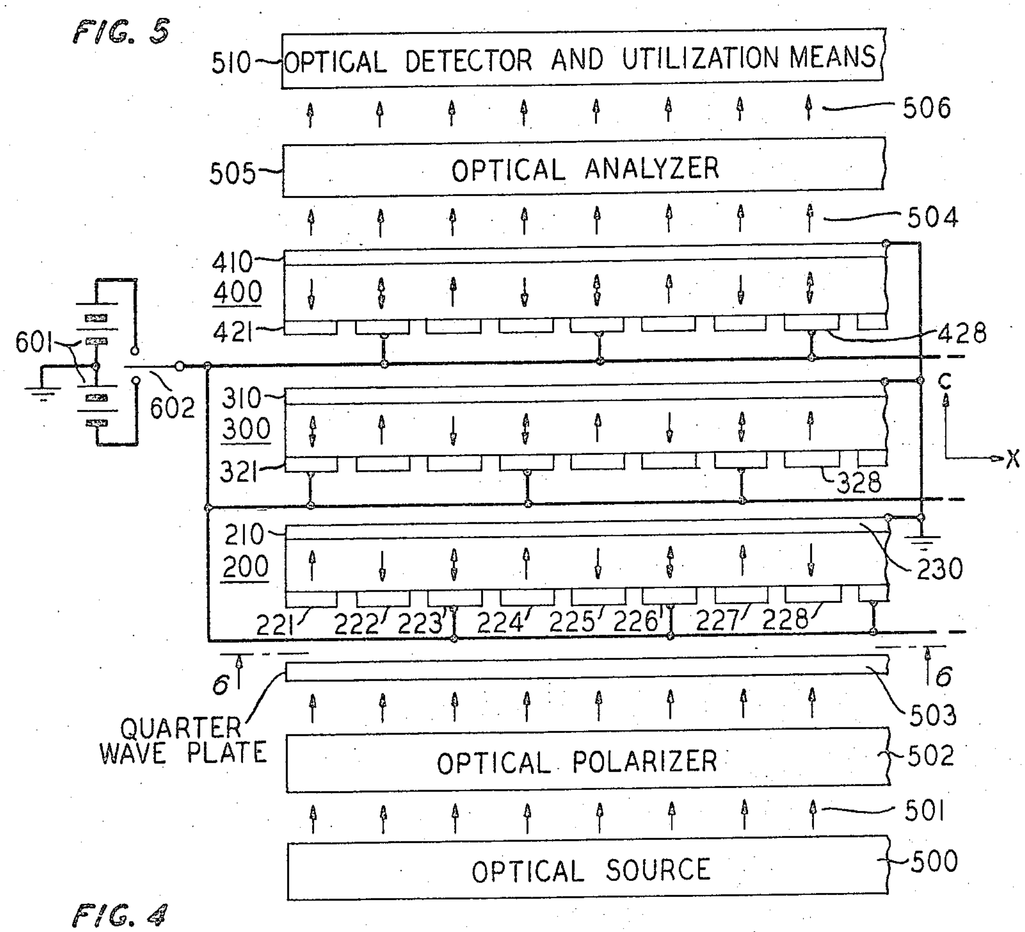
FIG. 5 is a side view diagram of an optical shutter, in accordance with another specific embodiment of the invention.
Figure 6:
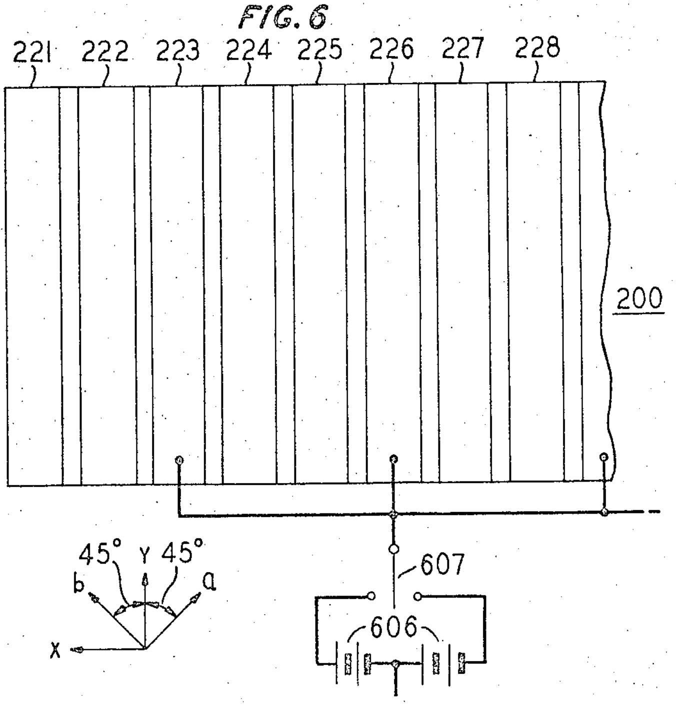
FIG. 6 is a top view diagram of the apparatus shown in FIG. 5.

FIGS. 5 and 6 illustrate another embodiment of the invention, in which three ferroelectric plates 200, 300, and 400 are arranged as the electrooptic element of an optical shutter device. Each of the plates 200, 300, and 400 is similar to the plate 100 described above including transparent grounded electrodes 210, 310, and 410, except that in FIGS. 5 and 6 transparent electrodes 221–228, 321–328, 421–428 are arranged (FIG. 6) advantageously much longer in the $y$ direction than in the $x$ direction, and only every third electrode is permanently connected to a voltage battery source 601 through a single-pole double-throw switch 602. In addition, the ferroelectric polarization directions of domains in the plates 200, 300, and 400 in regions underneath the other electrodes, which are not connected to the switch 602, are permanently set in the directions indicated by the one-way arrows in FIG. 6. This can be accomplished, for example, by propagating these domains by means indicated above in the description of the apparatus shown in FIGS. 1 and 2.

On the other hand, the polarization direction in the plates 200, 300, and 400 in these regions underneath those electrodes which are connected to the switch 602 are switched in the $\pm c$ direction alternately by reason of throwing of the switch 602 to the positive or negative terminal of the battery 601. A voltage pulse source can obviously be used in place of the battery 601 and switch 602.

In operation of the apparatus shown in FIGS. 5 and 6, an optical source 500 provides a preferably monochromatic beam of light 501 which propagates through an optical polarizer 502. Advantageously, the polarizer 502 is oriented to polarize the beam in the $x$ direction, i.e., at 45° to the (orthogonal) $a$ and $b$ axes of the crystal plates 200, 300, and 400 (all of which plates are aligned with their $a$ and $b$ axes mutually parallel). Then the beam of light propagates through a quarter-wave plate 503 which retards the $a$ component of optical radiation by a 90° phase shift more than the $b$ component. Thereafter, the beam of light propagates through the plates 200, 300, and 400, wherein the $a$ and $b$ components of optical radiation are relatively retarded advantageously by $\pm 90°$ in each plate, depending upon the direction of ferroelectric polarization in the domains through which the various portions of the cross section of the beam of light propagate. Thus, on propagating through both the quarter-wave plate 503 and the plates 200, 300, and 400, the various portions of the cross section of the optical beam undergo a total relative phase retardation equal to $90° \pm 90° = 0$ or 180°, depending upon the throw of the switch 602; since each portion of the beam propagates through two plates of opposite direction of domain polarization thereby producing a zero net relative phase retardation, and through the quarter-wave plate 503 and a third plate 200, 300, or 400 in which the polarization of the domain in the path of that portion of the beam can be in the $\pm c$ direction, depending upon the position of the switch 602 (and hence the polarity of the voltage supplied by the battery 601). As known in the art, a 180° relative phase retardation between orthogonal components of optical radiation corresponds to a spatial rotation of the direction of optical polarization equal to 90°. Thus, the beam of light 504, exiting from the plate 400, which is incident upon the optical analyzer 505, advantageously "crossed" (axis oriented perpendicular) with respect to the polarizer 502, will be extinguished or not, depending upon the throw of the switch 507; that is, depending upon the polarity of the voltage supplied by the battery 506 to those electrodes on the plates 200, 300, 400 to which this battery is connected. Thereafter, the resulting beam of light 506 (to the extent it is not extinguished) exiting form the analyzer 505 is detected and utilized by the means 505 therefor.

Thus, the apparatus shown in FIGS. 5 and 6 provides an optical beam shutter system. Alternatively, as should be obvious to the skilled worker in view of the above description, the optical analyzer 505 may be omitted and the exit optical beam will then have an optical polarization direction which is spatially oriented at an angle of 0 or 90°, depending upon the throw of the switch 602; thereby, the optical system shown in FIGS. 5 and 6 (without the analyzer 505) can be used as a controllable optical polarization rotator, useful for utilization for example by doubly refracting prisms in digital light deflection systems as known in the art.

Although the transparent electrodes shown in FIGS. 5 and 6 are shown as slightly spaced apart, these electrodes can be made in registry at their edges by overlapping them, but prevented from mutual contact by transparent electrically insulating layers therebetween.

Although the invention has been described in detail in terms of specific embodiments, various modifications can be made by the skilled worker without departing from the scope of the invention. In particular, various other ferroelectric crystal materials can be used, such as terbium molybdate; and the boundary of the ferroelectric domains need not touch any physical boundary of the crystal.

What is claimed is:

1. A device which comprises:

a. a ferroelectric plate capable of supporting a polarized domain, the boundary of which can be displaced in the plate in response to electric fields;

b. a first electrode located on a first surface portion of the plate of sufficient lateral extent and sufficiently proximate to an edge of the plate that the first electrode is substantially coextensive with the boundary of the domain in response to a first voltage applied to the first electrode; and c. a second electrode located on a second surface portion of the plate in sufficient proximity to the first electrode that the domain expands laterally in response to a second voltage applied to the second electrode so that the boundary of the domain becomes substantially coextensive with the projection in a geometric plane in the plate of the outer contour of the first and second electrodes.

2. An optical display device including:

a. the device recited in claim 1; and b. optical means to detect the domain.

3. A device according to claim 2 in which the electrodes are both transparent to the optical radiation in the optical means.

4. The device recited in claim 2 in which the optical means include an optical polarizer located in the path of an optical beam exiting from the plate.

5. A device which comprises:

a. a ferroelectric plate capable of supporting a polarized domain, the boundary of which can be displaced in the plate in response to electric fields;

b. an array of electrodes on a surface portion of the plate including a second electrode as next neighbor to a first electrode and a third electrode as next neighbor to the second electrode; and c. means for applying voltage pulses to the array of electrodes in a sequence consisting of a first pulse of one polarity to the first electrode, a second pulse of opposite polarity to the third electrode, a third pulse of the one polarity to the second electrode, a fourth pulse of opposite polarity to the first electrode, a fifth pulse of the one polarity to the third electrode, and a sixth pulse of opposite polarity to the second electrode.

6. The device recited in claim 5 in which the first, second, and third electrodes are transparent to an optical beam.

7. Apparatus which comprises:

a. the device recited in claim 6; and b. a source of the optical beam, arranged to direct the beam so that it propagates through the first, second, and third electrodes.

8. A device which comprises:

a. first, second, and third ferroelectric plates each of which is capable of supporting polarized domains, the boundaries of each of which can be displaced in response to electric fields, the plates arranged such that a beam of optical radiation can propagate through all the plates;

b. at least two transparent electrodes located on major surfaces of each of the plates; and c. voltage means connected to the electrodes sufficient to move the boundaries of the domains in response to the voltage applied to the electrodes such that each domain is extended from coextension with one electrode to coextension with two electrodes, so that the relative phase retardation of perpendicular polarization components of the beam of radiation propagating through the three plates is changed by a predetermined phase by the voltage.

9. The device recited in claim 8 in which the plates have a thickness such that the predetermined phase is $\pi/2$ or odd integral multiple thereof.

10. The device recited in claim 9 which further includes a quarter-wave plate located in the path of the beam.

* * * * *